(12) United States Patent
Inoue et al.

(10) Patent No.: US 9,395,622 B2
(45) Date of Patent: Jul. 19, 2016

(54) SYNTHESIZING LOW MASK ERROR ENHANCEMENT FACTOR LITHOGRAPHY SOLUTIONS

(71) Applicant: GLOBALFOUNDRIES INC., Grand Cayman (KY)

(72) Inventors: Tadanobu Inoue, Kawasaki (JP); David O. Melville, Houston, TX (US); Alan E. Rosenbluth, Yorktown Heights, NY (US); Masaharu Sakamoto, Kawasaki (JP); Kehan Tian, Hopewell Junction, NY (US)

(73) Assignee: GLOBALFOUNDRIES INC., Grand Cayman (KY)

( * ) Notice: Subject to any disclaimer, the term of this patent is extended or adjusted under 35 U.S.C. 154(b) by 120 days.

(21) Appl. No.: 14/185,506

(22) Filed: Feb. 20, 2014

(65) Prior Publication Data

US 2015/0234970 A1   Aug. 20, 2015

(51) Int. Cl.
| | |
|---|---|
| *G06F 17/50* | (2006.01) |
| *G03F 7/00* | (2006.01) |
| *G03F 1/36* | (2012.01) |
| *G03F 1/70* | (2012.01) |
| *G03F 7/20* | (2006.01) |

(52) U.S. Cl.
CPC ... *G03F 7/00* (2013.01); *G03F 1/36* (2013.01); *G03F 1/70* (2013.01); *G03F 7/70125* (2013.01); *G03F 7/70425* (2013.01); *G06F 17/50* (2013.01); *G06F 2217/12* (2013.01)

(58) Field of Classification Search
CPC ............. G03F 1/36; G03F 1/70; G03F 1/144; G03F 7/70425; G03F 7/70125; G03F 7/70258; G03F 7/70483; G03F 1/76; G03F 1/84; G03F 7/70433; G06F 17/50; G06F 2217/12; G06T 7/001; H01L 21/02

USPC ................................................ 716/52, 53, 54
See application file for complete search history.

(56) References Cited

U.S. PATENT DOCUMENTS

| | | | |
|---|---|---|---|
| 6,563,566 B2 | 5/2003 | Rosenbluth et al. | |
| 7,079,223 B2 * | 7/2006 | Rosenbluth ............. | G03F 7/705 355/53 |
| 7,651,822 B2 * | 1/2010 | Mizusako ........ | B29D 11/00365 430/311 |
| 7,903,337 B1 * | 3/2011 | Hunter ............... | G02B 26/0808 359/573 |
| 7,944,545 B2 | 5/2011 | Bagheri et al. | |
| 8,028,254 B2 | 9/2011 | Inoue et al. | |

(Continued)

OTHER PUBLICATIONS

Rosenbluth, A., et al. "Intensive Optimization of Masks and Sources for 22 nm Lithography". Proc. SPIE. Optical Microlithography XXII. Mar. 2009. vol. 7274. pp. 1-15.

(Continued)

*Primary Examiner* — Helen Rossoshek
(74) *Attorney, Agent, or Firm* — Yuanmin Cai; Hoffman Warnick LLC

(57) ABSTRACT

In one embodiment, a source mask optimization (SMO) method is provided that includes controlling bright region efficiency during at least one optical domain step. The bright region efficiency being the proportion of the total transmitted light that is transferred to bright areas of a target pattern. The optical domain intermediate solution provided by the at least one optical domain step may then be binarized to obtain an initial spatial domain solution with a controlled MEEF (Mask Error Enhancement Factor). The MEEF is controlled during at least one spatial domain step that optimizes the initial spatial domain solution.

17 Claims, 9 Drawing Sheets

(56) References Cited

U.S. PATENT DOCUMENTS

| | | | |
|---|---|---|---|
| 8,108,802 | B2 | 1/2012 | Rosenbluth et al. |
| 8,453,076 | B2 * | 5/2013 | Inoue ........................ G03F 1/36 716/53 |
| 8,479,125 | B2 * | 7/2013 | Pierrat ....................... G03F 1/36 716/50 |
| 8,539,390 | B2 | 9/2013 | Inoue et al. |
| 8,938,696 | B1 * | 1/2015 | Torunoglu .......... G06F 17/5068 716/53 |
| 8,954,898 | B2 * | 2/2015 | Inoue ................. G06F 17/5081 716/52 |
| 8,959,462 | B2 * | 2/2015 | Inoue ........................ G03F 1/70 716/54 |
| 2007/0196745 | A1 * | 8/2007 | Kamijima ................ G03F 1/144 430/5 |
| 2010/0141925 | A1 * | 6/2010 | Cao ......................... G03F 7/705 355/77 |
| 2010/0214553 | A1 * | 8/2010 | Kondo ................ G03F 7/70125 355/77 |
| 2010/0251202 | A1 * | 9/2010 | Pierrat ....................... G03F 1/36 716/50 |
| 2011/0012160 | A1 * | 1/2011 | Kitabayashi ............ H01L 33/22 257/98 |
| 2011/0107280 | A1 * | 5/2011 | Liu .......................... G03F 1/144 716/53 |
| 2011/0304918 | A1 * | 12/2011 | Ushigome ............ G02B 5/1895 359/576 |
| 2013/0066597 | A1 * | 3/2013 | Van Beurden ..... G01N 21/4788 703/1 |
| 2013/0179847 | A1 * | 7/2013 | Hansen ................... G06F 17/50 716/54 |
| 2014/0167017 | A1 * | 6/2014 | Shinotsuka ......... H01L 51/5268 257/40 |
| 2015/0054940 | A1 * | 2/2015 | Shi .......................... G06T 7/001 348/87 |
| 2015/0234269 | A1 * | 8/2015 | Azpiroz .................... G03F 1/76 430/5 |

OTHER PUBLICATIONS

Rosenbluth, A., et al. "Optimum Mask and Source Patterns to Print a Given Shape". Journal of Micro/Nanolithography, MEMS, and MOEMS. Apr. 2002. vol. 1. Issue 1. pp. 486-502.

Rosenbluth, A., et al. "Global optimization of the illumination distribution to maximize integrated process window". Proc. SPIE. Optical Microlithography XIX. Apr. 2006. vol. 6154. pp. 179-190.

Wu, T., et al. "SMO applied to contact layers at the 32 nm node and below with consideration of MEEF and MRC" Proc. SPIE. Photomask Technology 2011. Oct. 2011. vol. 8166. 8 Pages.

Xiao, G., et al. "Source optimization and mask design to minimize MEEF in low k1 lithography" Proc. SPIE. Photomask and Next-Generation Lithography Mask Technology XV. Jun. 2008. vol. 7028. 11 Pages.

* cited by examiner

SYNTHESIZING LOW MASK ERROR ENHANCEMENT FACTOR LITHOGRAPHY SOLUTIONS

BACKGROUND

1. Technical Field

The present disclosure relates to mask design technology. More particularly, the present disclosure relates to using mask error enhancement factors (MEEF) in source mask optimization techniques.

2. Description of the Related Art

Minimum printed feature sizes in semiconductor devices become finer due to continuous requirements for ever higher performance and faster operation of the devices while reducing space consumption of information processing apparatuses. Thus, the minimum feature size of state of the art semiconductor devices reaches to about 22 nm or less. Masks having patterns of structures for semiconductor devices may be used for photolithography of layers included in semiconductor devices. Patterns for forming a semiconductor device are provided by the mask so as to expose the patterns of the mask with an adequate photo-imaging technology, including immersion exposure technologies. At current small feature sizes, photo-imaging technology is limited by a physically-driven degradation in image quality, and the associated resolution limitation makes it difficult to maintain adequate yields during manufacture of semiconductor devices with state-of-the-art feature sizes.

In general, Source Mask Optimization (SMO) makes best use of the limited optical resolution by initiating the design flow in the optical domain, thus identifying the best set of optical amplitudes that the mask can provide for printing the desired devices using the available optical resolution. However, a general behavior of optimization processes is that factors that are not explicitly addressed in the formulation will often tend to be driven to extreme/unfavorable values. In the SMO case, the key concern is that frequency-domain solutions will often be driven to large-DOF (depth of focus) patterns that unfortunately have excessive diffracting structure in, e.g., dark mask regions, making the masks overly difficult to fabricate within achievable tolerances.

SUMMARY

In some embodiments, a method for synthesizing low mask error enhancement factor (MEEF) lithography solutions is provided using a source mask optimization (SMO) flow that extends from the optical domain to the polygon domain by using efficiency constraints in a frequency domain, and directly controlling/improving MEEF in the spatial domain. In one embodiment, an SMO method is provided that includes controlling bright region efficiency during at least one optical domain step. The bright region efficiency may be the proportion of the total transmitted light that is successfully transferred to bright areas of a target pattern. A following step of the method includes binarizing an optical domain intermediate solution provided by the at least one optical domain step to obtain an initial spatial domain solution with a controlled MEEF. In a following step, the MEEF is controlled during at least one spatial domain step to optimize the initial spatial domain solution.

In some embodiments, a non-transitory computer readable storage medium is provided that includes a computer readable program for performing an SMO method, wherein the non-transitory computer readable program when executed on a computer causes the computer to perform a series of steps that include controlling bright region efficiency during at least one optical domain step. The bright region efficiency is the proportion of the total transmitted light that is transferred to bright areas of a target pattern. In a following step, an optical domain intermediate solution is provided by the at least one optical domain step to obtain an initial spatial domain solution with a controlled MEEF. In yet another step, the method includes controlling MEEF during at least one spatial domain step that optimizes the initial spatial domain solution.

In another embodiment, a method of patterning a semiconductor device is provided that includes providing a mask that has been produced using a source mask optimization process that includes controlling MEEF during at least one step of the source mask optimization and patterning a photoresist layer using the mask.

BRIEF DESCRIPTION OF DRAWINGS

The disclosure will provide details in the following description of preferred embodiments with reference to the following figures wherein.

DETAILED DESCRIPTION OF THE DRAWINGS

Figure 1:
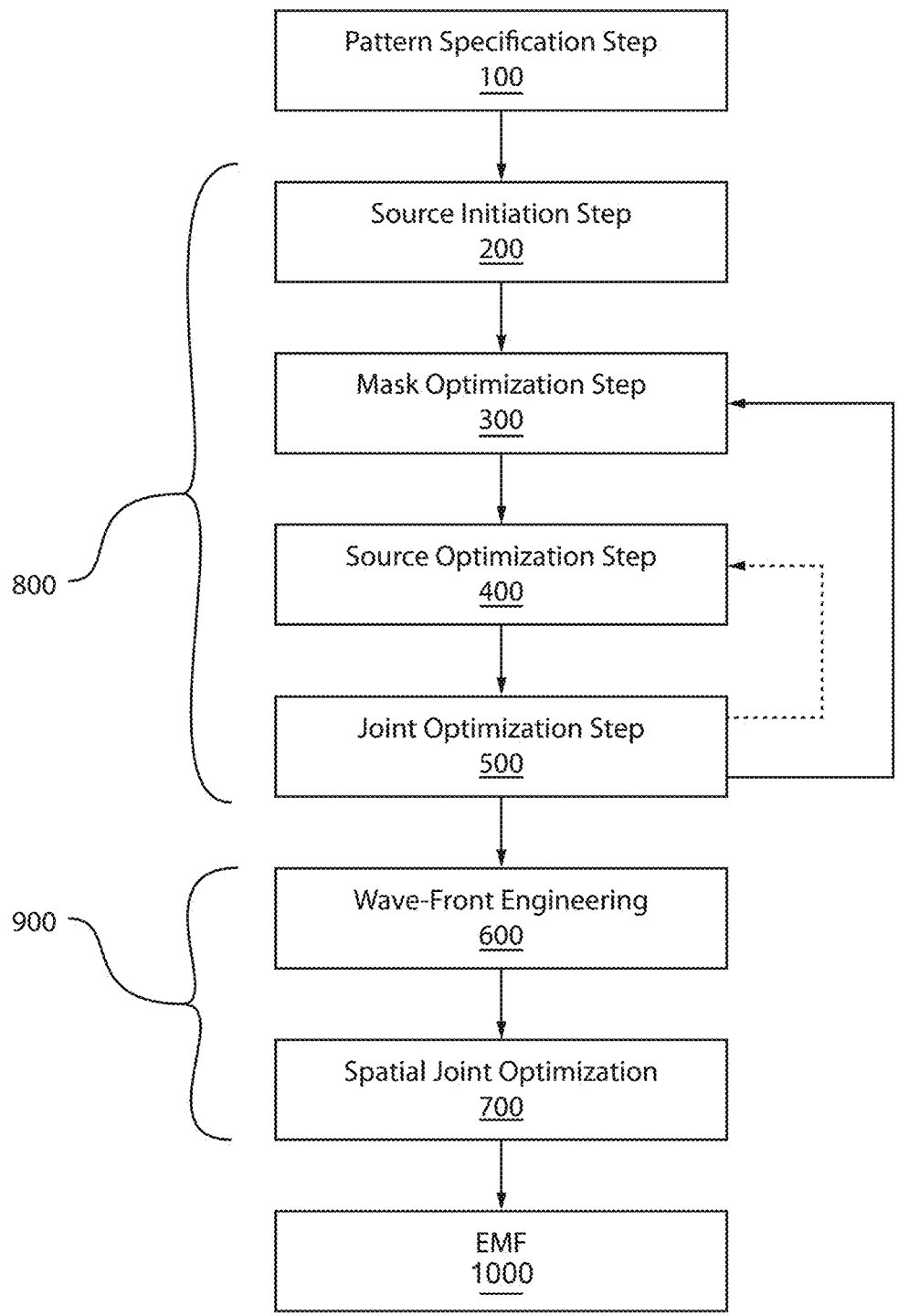
FIG. 1 is a flow chart outlining an SMO process according to one embodiment of the present disclosure.

The methods and computer products that are disclosed herein can minimize potential polygon-specific vulnerabilities during a complete SMO flow that can extend from the optical domain to the polygon domain. Detailed embodiments of the claimed methods and computer products are disclosed herein; however, it is to be understood that the disclosed embodiments are merely illustrative of the claimed methods and computer products that may be embodied in various forms. In addition, each of the examples given in connection with the various embodiments are intended to be illustrative, and not restrictive. Further, the figures are not necessarily to scale, some features may be exaggerated to show details of particular components. Therefore, specific structural and functional details disclosed herein are not to be interpreted as limiting, but merely as a representative basis for teaching one skilled in the art to variously employ the methods and structures of the present disclosure. Reference in the specification to "one embodiment" or "an embodiment" of the present principles, as well as other variations thereof, means that a particular feature, structure, characteristic, and so forth described in connection with the embodiment is included in at least one embodiment of the present principles. Thus, the appearances of the phrase "in one embodiment" or "in an embodiment", as well any other variations, appearing in various places throughout the specification are not necessarily all referring to the same embodiment.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

FIG. 1 depicts one embodiment of an SMO flow. In one embodiment, the SMO flow includes a pattern specification step 100, source initialization step 200, mask optimization step 300, source optimization step 400, joint optimization step 500, wavefront engineering step 600 and spatial joint optimization step 700. The optical domain, which may also be referred to as the frequency domain 800, of the SMO flow may include the source initialization step 200, the mask optimization step 300, the source optimization step 400, and the joint optimization step 500. The polygon domain, which may also be referred to as the spatial domain 900 may include the steps of the wavefront engineering step 600 and the spatial joint optimization step 700. Mask optimization step 300 may also be referred to as "mask initiation" or "mask initialization".

In some embodiments, the methods disclosed herein provide an SMO flow that controls the bright region efficiency during at least one optical domain 800 step, that binarizes an optical-domain intermediate solution provided by the at least one optical domain step to obtain an initial spatial domain solution with a controlled MEEF, and that controls MEEF during at least one spatial domain 900 step that optimizes the initial spatial domain solution.

The term "polygon domain", also referred to as spatial domain 900, refers to a mask representation based on polygons that have approximately the same shape as the apertures in the mask blank film. These polygonal apertures are fabricated in the manufactured mask, with the location of the polygon edges serving as variables whose chosen values essentially define the mask patterns. The polygon apertures typically have a transmission of 1, and the mask regions surrounding the polygons typically have the same transmission as the mask blank film.

The term "optical domain", also referred to as the frequency domain 800, refers to a mask representation, in which the mask variables essentially represent the amplitude of the light that transmits through the mask. The amplitudes used by the SMO may be taken in a plane immediately past the mask, in which case they essentially represent the transmission of the mask, or they may be taken in the pupil of the projection lens, which collects the transmitted light and images it onto the semiconductor device substrate. Photolithographic lenses are almost always telecentric, and for convenience the pupil is referred to as the pupil plane in the general case. The plane adjacent to the mask through which light exits is the object plane. The pupil plane amplitudes are related to the object plane amplitudes by Fourier-transformation in the usual case of scalar mask variables.

Likewise, the band-limited portion of the object plane amplitudes will be the inverse Fourier-transform (iFT) of the collected pupil amplitudes, and in some forms of SMO, the optical variables only include light components that are captured by the projection lens. It should be noted that this collection process by the lens constitutes a band-limiting or filtering process. Those skilled in the art will recognize that it is also possible to use a convention in which the roles of the transform and inverse transform are reversed, but for simplicity such a convention will not be considered in the discussion below.

To distinguish these Fourier-transformations in the physical space of a lens system from the temporal Fourier-transformations that are commonly used in other electrical engineering contexts, the optical variables in SMO are conventionally said to comprise spatial frequencies. An optimization of the optical variables is sometimes referred to as an optimization in the spatial frequency domain, often referred to more briefly as a frequency domain optimization. The term "frequency domain" is sometimes employed in SMO regardless of whether the light amplitudes are measured in the pupil plane or the object plane, but this usage is not universal.

Mask Error Enhancement Factor (MEEF) is the amplification factor of the mask dimension error on the wafer. When MEEF is low, the impact of mask error is small. The ability to minimize MEEF during lithography optimization can be essential to obtain a large process window. Mask error enhancement factor (MEEF) at a particular printed feature edge on the wafer can be defined as the change in the printed edge location $X_{wafer}$ that is produced per unit of increased bias $b_{mask}$ in the dimensions of all mask features in the neighborhood of the mask location conjugate to the particular printed feature edge. Although the mask features are typically enlarged 4×, it is customary to express $b_{mask}$ in the 4× reduced scale of the wafer features. MEEF can thus be expressed mathematically as:

$$\text{MEEF}(X) = dX_{wafer}/db_{mask}.$$

Traditionally, MEEF is calculated by measuring CD change across a cut line. Multiple cut lines are placed across challenging locations. MEEF tends to increase when excessive edge content is deployed adjacent to primary features (e.g. from assists), and when image sidewalls suffer from low contrast in general.

In some embodiments, a method of synthesizing low MEEF lithography solutions is provided. In some embodiments, the method may begin with setting a bright region efficiency constraint. As used herein, a "bright region" refers to a region of an image pattern that is intended to be brighter than the exposure threshold of the resist. The bright region efficiency is essentially the portion of the total light transmitted by the mask that is successfully transferred to the bright areas of a target pattern. The bright region efficiency is an indicative value of image contrast in the spatial frequency domain. MEEF becomes higher when image contrast is relatively low. In addition, images in which the power per unit bright area is large compared to the overall power per unit area can be expected to result from polygon-domain masks that have relatively little assisting diffractive content in darks regions of the mask, which would tend to increase MEEF. For these reasons, high bright region efficiency in an optical domain solution indicates a potential to achieve low MEEF in the subsequent spatial domain result. In one embodiment, the bright region efficiency constraint is an efficiency measurement in accordance with the following equation:

Efficiency=(Power of Bright Area/Area of Bright)/(Power of Total Diffracted In Band Limit/Area of Total)

The numerator of this expression represents the power density transferred to bright regions of the image, while the denominator represents the overall power density of collected light, i.e., the total transmitted power per unit image field area. In embodiments where the target wafer shapes are not changed by the optimization process, the region areas involved in calculating the efficiency metric are constants. Thus, the efficiency metric essentially describes the portion of the total transmitted light that is successfully transferred to the bright areas of a target pattern. More generally, the efficiency may be normalized by the bright region area and total area in such a way that the efficiency represents the ratio of the power density achieved in bright areas as compared to the power density present in the image field as a whole, allowing more meaningful comparisons of the efficiencies achieved with target patterns of different bright region area.

The "power of the bright area" is the power of light from the light source that is in the bright region of the image pattern, and the "area of bright" is the area of the bright region of the image pattern. The "Power of Total Diffracted In Band Limit" is the power from the light source that is collected by the projection lens, and the "Area of Total" is the area entire pattern, i.e., wafer, including both bright regions and dark regions. These power levels can be expressed in arbitrary units since the Efficiency metric is a ratio. When wafer intensities are calculated by standard methods, the conventions most commonly used are to either express the source power in units such that the total source power is 1, or to use source power units in which the illumination directionality space is gridded, with the maximum available power level within each grid box being set to 1.

Figure 2:
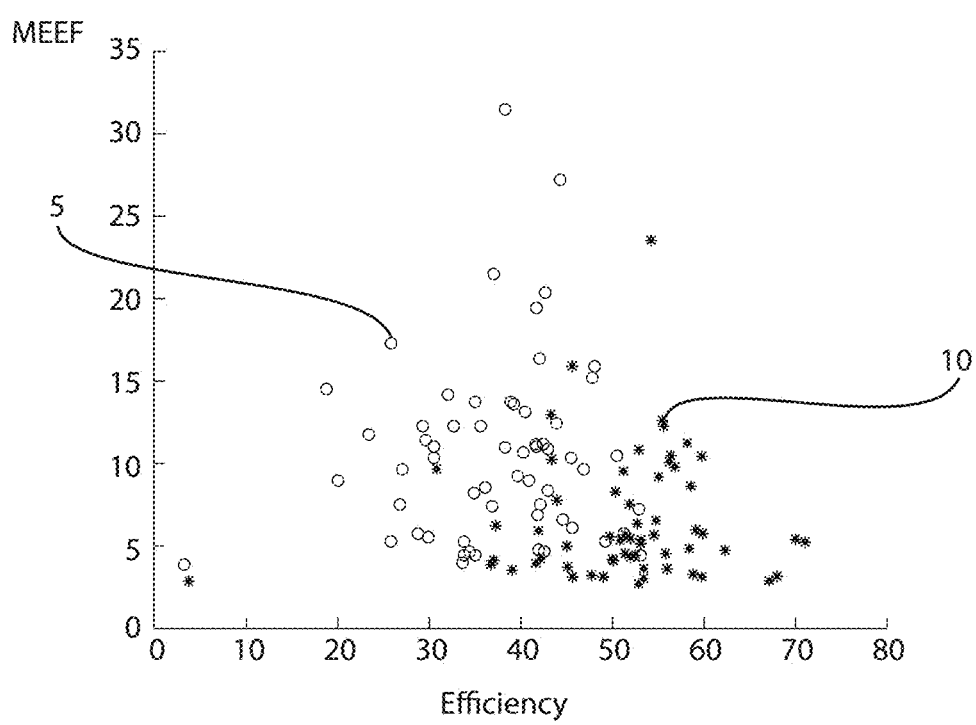
FIG. 2 is a plot of the distribution of MEEF values for a variety of targets as a function of the bright region efficiency constraint, in accordance with one embodiment of the present disclosure.

FIG. 2 depicts a plot illustrating the relationship between the MEEF and the bright region efficiency constraint, in which the y-axis of the plot is the MEEF, and the x-axis of the plot is the bright region efficiency constraint. The plot illustrated in FIG. 2 is a distribution of MEEF values for a variety of targets. The data set identified by reference number 5 is the MEEF values of targets processed using an SMO process flow without using a bright efficiency constraint. The data set identified by reference number 10 is the MEEF values of targets processed using an SMO process using a bright efficiency constraint. FIG. 2 illustrates that the final MEEF values are lowered by using an SMO process flow employing the bright efficiency constraint when compared to an SMO process flow that does not employ the bright efficiency constraint. This happens because the efficiency metric can serve as a surrogate for MEEF during optical-domain steps in which MEEF per se is not strictly definable, since no bias-vulnerable polygons are as yet present in the mask representation. Because it lacks such surrogates, prior-art optimization in the optical domain can "over-drive" the creation of so-called proto-assists whose benefit is only significant up to a point, to a level that when deployed in a fully intensive way will degrade MEEF quality in the polygon-domain masks that are ultimately derived from the optical-domain masks. Excessive modulation in non-printing regions of optical-domain masks can therefore be unfavorable for MEEF even though MEEF levels for these optical-domain masks are not strictly definable. When information about MEEF or MEEF surrogates is not available to the optimizer, the solution may be driven to include very large numbers of proto-assists, even if many of these proto-assists only provide a completely negligible and unimportant improvement in the image quality metric being maximized, since the optimizer has no awareness of the severe MEEF degradation that is potentially being incurred. However, the efficiency metric will be degraded by the creation of such proto-assists, making the efficiency metric a useful optical-domain surrogate for MEEF. Thus, inclusion of bright efficiency constraints effectively provides the optimizer with MEEF-awareness during optical-domain solution steps, while also highlighting regions of poor image contrast which are indicative of further MEEF vulnerability. The SMO process flow employing the bright efficiency constraint is now described in greater detail with reference to FIG. 1.

Once the bright region efficiency constraint has been set, it may be used in at least one step of the frequency domain 800 of the SMO process flow. The SMO is preferably a flow comprising multiple optimizations. The SMO flow evolves from the frequency domain 800 optimizations to the spatial domain 900 optimizations. Using the bright region efficiency constraint through the frequency domain 800 maintains good potential MEEF capability throughout the frequency domain SMO, and helps ensures that the polygon topology with which spatial domain SMO is initiated does not lock the output mask into an inferior MEEF condition. In one embodiment, employing a higher bright region efficiency constraint in the frequency domain 800 of the SMO process flow provides a lower MEEF in the spatial domain 900 of the SMO process flow. Further, employing the bright region efficiency constraint in the SMO process flow provides MEEF improvement in the absence of other elements of MEEF control, such as MEEF-aware adjustment of mask polygon edges.

Figure 3A:
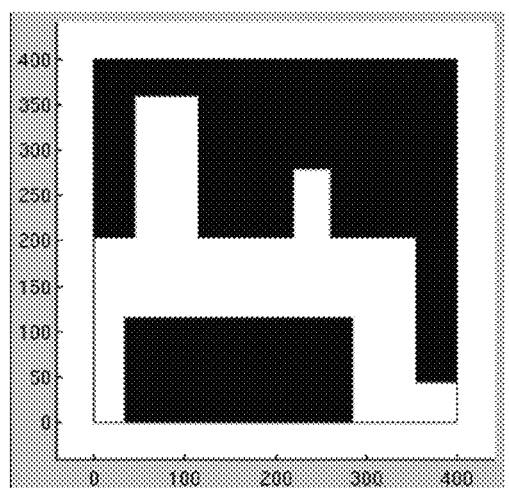
FIG. 3a depicts one embodiment of a target pattern, in accordance with the present disclosure.

The frequency domain 800 of the SMO flow, also referred to as optical domain, may include at least one source initialization step 200, mask optimization step 300, source optimization step 400, and joint optimization step 500. In some embodiments, prior to the source initialization step 200, the frequency domain 800 of the SMO flow includes a pattern specification step 100. In the pattern specification step 100, the desired circuit patterns are specified as the input to optimizing the lithographic fabrication of the circuit, as are the characteristics of the lithographic exposure tool to be employed to form lithographic patterns for multiple exposures. FIG. 3a depicts one example of a pattern, also referred to as a target, that can be set during the pattern specification step 100.

Referring to FIG. 1, in a step following the pattern specification step 100, the frequency domain of the SMO process may begin with the source initiation step 200. In the source initiation step 200, a least one light source shape is selected. Each of the at least one initial source shape may, for example, be chosen by methods known in the art for choosing sources based on the desired circuit patterns and the exposure tool characteristics. If multiple exposures are used, an initial source may be chosen for each exposure.

Referring to mask optimization step 300, a set of optimal image forming waves is chosen for the mask. In some examples, these waves implicitly define the content of the mask. In some embodiments, the bright region efficiency step may be set during the mask optimization step 300. In the mask optimization step 300, the bright region efficiency constraint may be set. In one embodiment, the bright region efficiency constraint may be set using a joint eigenvector based mask optimization step, using the methods described in U.S. Pat. No. 6,563,566 titled "System and method for printing semiconductor patterns using an optimized illumination and reticle", and U.S. Pat. No. 7,944,545 titled "High contrast lithographic masks", which are incorporated herein by reference. As used herein, an "eigenvector" refers to a vector that, upon multiplication with an associated matrix, produces a scalar multiple of the original vector. The scalar multiplier is the associated eigenvalue. As used herein, a "joint eigenvector" refers to a vector that is an eigenvector of two different matrices (bright-region matrix and dark-region matrix), in particular in a basis where one matrix is scaled to have unit eigenvalues. The eigenvalues of the other matrix are referred to as joint eigenvalues. The joint eigenvectors are eigenvectors of the matrix that relate the intensity of the light source and intensity on the wafer, and enable the derivation of a high contrast mask solution, as described in the publication A. E. Rosenbluth, S. Bukofsky, C. Fonseca, M. Hibbs, K. Lai, A. Molless, R. N. Singh, and A. K. K. Wong, "Optimum Mask and Source Patterns to Print a Given Shape," JM3 1, no. 1 (2002): p. 22, which is incorporated herein by reference. Further description of how the joint eigenvectors are eigenvectors of the matrix that relate the intensity of the light source and intensity on the wafer, and enable the derivation of a high contrast mask solution can be found in U.S. Pat. No. 6,563,566 and U.S. Pat. No. 7,944,545, which are incorporated herein by reference. The term "high contrast" as used to describe the mask solution provided in the mask optimization step 300 means bright-to-dark contrast. Some examples of a high contrast mask solution can be found in U.S. Pat. No. 6,563,566 and U.S. Pat. No. 7,944,545, which are incorporated herein by reference. The mask optimization step 300 provides an optical-domain stalling solution for subsequent flow steps, with this starting solution having the potential to achieve low MEEF values in the final polygon-domain rendition that evolves from it, because the mask is initialized by searching out in near-exhaustive fashion the maximum contrast solution in a defocused plane, yielding a solution in which "proto-assists" are only deployed in a frugal and minimally necessary way. "Proto-assist" refers to sub-threshold (i.e. non-printing) lobes of light within dark areas of dark-background optical-domain masks, or to non-printing diminutions of intensity in bright areas of bright-background optical-domain masks, which will generally give rise to assist features when the optical-domain mask is rendered as polygon-domain. Such proto-assists are often necessary in order to meet the bright region defocused intensity requirements imposed during mask optimization step 300, so proto-assists will already be present in the output of step 300 if needed. However, such proto-assists will only be present to the minimal extent necessary, since they tend to degrade the bright-to-dark contrast that is optimized in step 300. Since assist features in the final polygon-domain solution represent additional edges in the neighborhood of main feature edges, they tend to increase the impact of mask bias error, i.e., they tend to degrade MEEF. By deploying assists only to the minimal extent necessary, mask optimization step 300 provides a strong starting point for subsequent flow steps. In transitioning from one flow step to the next it is desirable that this favorable MEEF potential be maintained or augmented, as will be discussed. The mask optimization step 300 may be run separately for each circuit clip. A "clip" or "circuit clip" refers to a separate set of features in a semiconductor circuit. The term "clip" may also be used to refer to a "mask clip", which is the portion of a mask that is used to print a given circuit clip. Upon completion of mask optimization step 300, the efficiency metric is computed for each of the optical-domain output mask clips. These efficiency values are used as constraint setpoints for the bright efficiency constraints that are introduced during subsequent optical-domain optimization steps. By requiring that the desirable efficiency levels attained in mask optimization step 300 be maintained during subsequent optical-domain optimizations, these bright efficiency constraints prevent the generation of excessive proto-assisting content.

Referring to the source optimization step 400, once the optical wavefronts have been optimized against the mask optimization objective in view of the bright region efficiency constraint, the source shape or the source shapes are re-optimized using the global method described in the publications A. E. Rosenbluth and N. Seong, "Global Optimization of Illumination Distribution to Maximize Integrated Process Window", SPIE v.6154 Optical Microlithography XIX (2006): p. 6154H, which are incorporated herein by reference. Even though the mask optimization step 300 may be carried out for each independent clip being optimized, the source optimization step 400 may consider all mask clips, since within each exposure all clips are illuminated by the same source having the same source shape.

Referring to the joint optimization step 500, the source variables taking into account the bright region efficiency constraint and the wave-front variables taking into account the bright region efficiency constraint are all optimized together using a local optimizer, as described in the publications A. E. Rosenbluth, S. Bukofsky, C. Fonseca, M. Hibbs, K. Lai, A. Molless, R. N. Singh, and A. K. K. Wong, "Optimum Mask and Source Patterns to Print a Given Shape," JM3 1, no. 1 (2002): p. 13 and A. E. Rosenbluth, D. O. S. Melville, K. Tian, S. Bagheri, J. Tirapu-Azpiroz, K. Lai, A. Waechter, T. Inoue, L. Ladanyi, F. Barahona, K. Scheinberg, M. Sakamoto, H. Muta, E. Gallagher, T. Faure, M. Hibbs, A. Tritchkov, and Y. Granik, "Intensive Optimization of Masks and Sources for 22 nm Lithography," in Optical Microlithography XXII, Proc. of SPIE Vol. 7274 727409, which are each incorporated herein by reference. This step accounts for interactions between the source and mask variables. Hence, this step is referred to as joint optimization. The wavefront variables describe the patterns present in the optical content produced by the mask, which in the context of image formation can be understood as the spatial frequency content transmitted by the mask. For this reason the joint optimization step 500 is sometimes referred to as "frequency-domain joint optimization".

The joint optimization step 500 may have a negative impact on the MEEF, because the optical domain mask variables provide no direct representation of biasing in mask polygons (i.e. bias in polygonal mask apertures). The bright region efficiency constraint is useful in this instance as a surrogate for insensitivity to mask bias.

The optical domain process flow, including the source initialization step 200, the mask optimization step 300, the source optimization step 400, and the joint optimization step 500, with a controlled bright region efficiency produces an optical domain intermediate solution (though for convenience the term optical domain intermediate solution may be reserved for the output of a final iteration in a sequence of several iterations through these steps, as will be discussed).

Figure 3B:
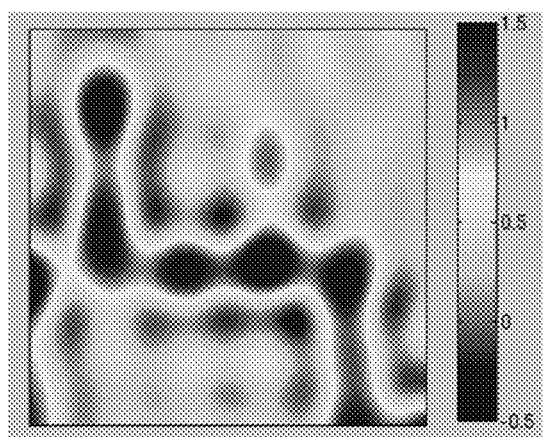
FIG. 3b depicts an inverse Fourier transform (iFT) mask for the target depicted in FIG. 3a after the frequency domain of the SMO process without using the bright efficiency constraint.
Figure 3C:
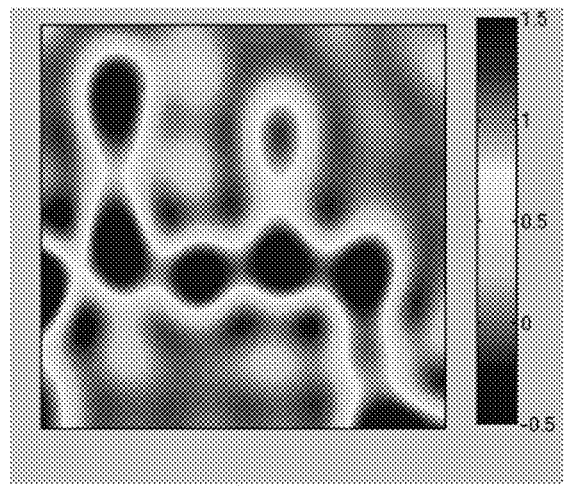
FIG. 3c depicts an inverse Fourier transform (iFT) mask for the target depicted in FIG. 3a after the frequency domain of the SMO process using the bright efficiency constraint, in accordance with one embodiment of the present disclosure.

FIGS. 3b and 3c show the inverse Fourier transform of optimized frequency domain diffraction orders, showing that the optimum optical amplitudes may be described either as diffraction order amplitudes in the collection pupil of the lens, or as transmitted amplitudes in the exit plane of the mask. Regardless of the plane they are evaluated in, these amplitudes define the optimal set of imaging waves that can be projected through the limited bandwidth of the lens in order to form the desired wafer image.

In some embodiments, the mask optimization step 300, the source optimization step 400 and joint optimization step 500 may optionally be iteratively repeated, e.g., for two or three iterations, until finally common window is used as the objective. These iterations are indicated by a looping flow arrow from the joint optimization step 500 to the mask optimization step 300 and a looping flow arrow from the joint optimization step 500 to the source optimization step 400. After these iterations involving multiple looping of the mask optimization step 300, the source optimization step 400 and the joint optimization step 500 are completed, the output of the final iteration is referred to as the optical domain intermediate solution. The quality of the optical domain intermediate solution is usually considerably improved over the quality of the initial solution. For example, the solution for the source shape is usually considerably improved over the initial source solution, i.e., the initial source shape.

FIG. 3b depicts an inverse Fourier transform (IFT) mask after the frequency domain 800 of the SMO process flow, i.e., after the source initialization step 200, the mask optimization step 300, the source optimization step 400, and the joint optimization step 500, without using the bright efficiency constraint. FIG. 3c depicts one embodiment of an inverse Fourier transform (IFT) mask after the frequency domain of the SMO process flow using the bright efficiency constraint. FIG. 3c has higher contrast than FIG. 3b, and no SRAF are generated. As will be discussed, the FIG. 3c solution (with bright efficiency constraint) provides for mask solutions with potentially lower MEEF than does the solution in FIG. 3b.

The optical domain solution deploys proto-assists in a frugal way, where the term proto-assists refers to amplitude lobes that will form sub resolution assist features (SRAF) when the optical domain solution is rendered as polygons. As discussed, the proto-assisting content in the optical domain solution will generally be sufficient to achieve optimal image quality, or at worst will only depart from the optimal value attainable in the optical domain by a negligible amount, while avoiding the excessive densities of proto-assists that can degrade MEEF levels in the final polygon domain solution.

Referring to FIG. 1, the spatial domain 900, which may also be referred to as the polygon domain, follows the frequency domain of the SMO process flow, and may include the steps of the wavefront engineering step 600 and the spatial optimization step 700. The term "wavefront" refers the set of mask spatial frequencies that are actually collected by a projection lens, considering all illumination directions present in the source. The wavefront may also be evaluated in the exit plane of the mask, with this amplitude being related to the amplitude at the collection aperture of the projection lens by a Fourier transform operation. In the spatial domain 900, the MEEF is controlled directed as an objective or as a constraint. Further, linearized mask manufacturability constraints prevent the wavefront engineering step 600 from introducing small filaments and decorations into the mask that would exhibit a high MEEF, and/or be hard to manufacture.

For example, in one embodiment, the optical domain intermediate solution provided by the optical domain process flow may be binarized in the spatial domain to obtain an initial spatial domain solution with controlled MEEF. As used herein, the term "binarized" is used to describe the outcome of replacing the optical domain intermediate solution by a set of mask regions of fabricable transmission that will transmit the optical domain intermediate solution when illuminated. For example, when the mask-making process involves forming clear transmitting apertures in an opaque film, the binarized solution may take the form of a bitmap having two possible transmission values for each pixel, for example, 0 and 1. The optical domain intermediate solution may be represented as an optimized set of wave amplitude values whose ratios are known upon completion of the optical domain process flow, but with the overall magnitude of this intermediate solution being dependent on the efficiency with which the (initially unknown) transmitting mask regions can produce the optimized wave amplitudes, and with the overall magnitude therefore remaining indeterminate until such polygons are defined. Since the entire optical domain intermediate solution wave has a fixed shape (as determined by the known wave amplitude ratios), the undetermined overall amplitude may be characterized by the magnitude of any single wave component of the solution that has non-zero amplitude. The wave component that is chosen to represent the overall magnitude is referred to as a base amplitude. For example, the DC component (also referred to as the zero order or the DC spatial frequency) is usually non-zero, and may then be used as the base amplitude. In cases where apertures of fabricable transmission and shape are not capable of exactly transmitting wave amplitudes that have the known ideal ratios, a suitably close approximation to the ideal ratios may instead be produced, as will be discussed. However, a simple embodiment in which the amplitude of the optical domain intermediate solution (calculated in the exit plane of the mask) is binarized by simply rounding to the nearest fabricable transmission value is not generally preferred, since such rounding can produce very substantial distortion in the transmitted wave. Although such distortion can be partially corrected by post-adjusting the shapes and sizes of each created aperture (i.e. each created region of fabricable transmission), a simple rounding method is likely to give rise to one or more transmitting regions that are wholly spurious, and it is difficult for mere shape and size adjustments to compensate for the presence of such spurious regions, or to compensate for the absence of desirable regions that a simple rounding method may entirely extinguish. In one embodiment, the binarization problem is instead formulated as a near linear programming problem, which means that the globally (or near globally) optimal set of transmitting pixel values can be determined, so that no spurious regions are created, and no desirable regions are omitted. Further, controlling the MEEF during at least one spatial domain 900 step optimizes the initial spatial domain solution.

The wavefront engineering stage 600 is a step for changing the ideal mask in spatial frequency domain into the spatial domain mask. (Diffraction pattern is identical to the Fourier transform of the wave amplitudes at the exit face of the mask.) The wavefront engineering step of the overall SMO flow (which may be referred to as WE) is the step to synthesize a set of mask polygons that successfully reproduce the optical-domain (aka frequency-domain) mask solution that is produced during the steps of setting the bright region efficiency constraint and using the bright region efficiency constraint throughout the frequency domain SMO.

Wavefront engineering (WE) should preferably mitigate MEEF, i.e., control MEEF. In some embodiments, the MEEF constraint/objective is introduced to the wavefront engineering (WE) 600 for mitigating MEEF. The MEEF constraint/ objective is inherently quadratic, because the optical intensity is the square of diffraction order amplitude. In some embodiments, a first stage of wavefront engineering synthesis provides a linearization of the MEEF constraint, allowing the binarization problem to be solved as a near linear programming problem. In some embodiments, the MEEF constraint is linearized by introducing variables that indicate the presence or absence of a transmission discontinuity during wavefront engineering stage-1. In some embodiments, because intensity is quadratic, the derivative of intensity with respect to (w.r.t.) mask size change (mask bias) involves products of nominal amplitudes and perturbed amplitudes. The image slope is also quadratic, but the wave amplitude ratios of the wave components are fixed. The base amplitude term can then be canceled from both sides of the constraints that determine MEEF, achieving linearity.

Figure 4:
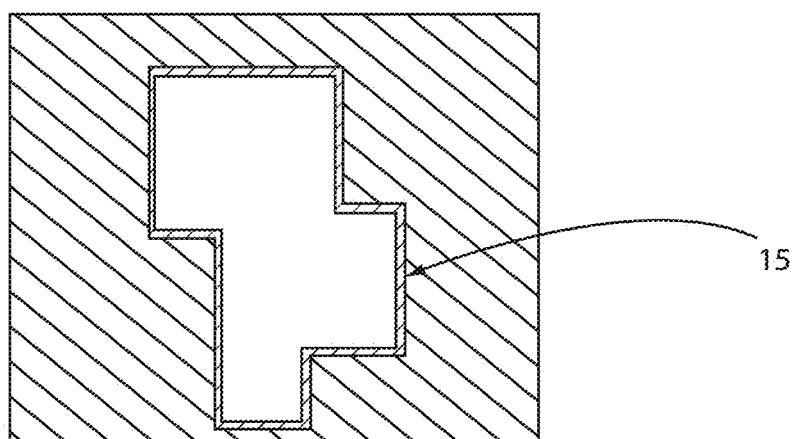
FIG. 4 is a top down planar view of a mask depicting the extra rim that results from a mask bias error, in accordance with one embodiment of the present disclosure.

Referring to FIG. 4, the MEEF (local mask bias) implies an extra rim at pixel edges 15, where a transition occurs. Linear constraints can be defined for binary or relaxed variables "e" (edge variable) which force each element of e to be 1 when the associated edge is a true transmission discontinuity, and 0 otherwise. Therefore, the value "e" thus constitutes a list of variables in which the entries (variable values) are 1 for all bitmap pixel edges along the borders of contiguous regions of fabricable transmission, i.e., along the borders of the mask polygons. The entries in "e" that correspond to pixel edges in the interior of regions of contiguous transmission are set to 0; the pixel edges associated with these entries are located in the interior of mask polygons. Points on the edges of bitmap pixels whose "e" value is 1 are locations where extra transmitted amplitude is created when the mask exhibits local bias, and the impact of local mask bias is then determined by these locations at which extra amplitude is generated. The mask bias impact can in turn be used to establish whether a constraint on MEEF is satisfied. Further, the constraint which establishes whether MEEF is satisfied can be expressed in linear form (in terms of the e variables), allowing the continued representation of the wavefront engineering problem as a near linear programming problem, which can be solved globally.

The wavefront engineering step 600 creates a bitmap mask by binarizing the optical domain intermediate solution (in the binary mask case), and its algorithm drives the transmission of all bitmap pixels to values that are supported by the mask fabrication process. For example, in the simple generic case where the physical mask consists of open apertures in an opaque film, e.g., a simple binary mask, the supported pixel transmissions are "0" and "1". The set of problem variables during wavefront engineering includes a list denoted t of the pixel transmissions. In some embodiments, the first stage of the wavefront engineering step drives all elements of t to either 0 or 1 in the output solution. Given the resulting 0,1 bitmap, mask polygons may be extracted for further processing during polygon-domain SMO steps of the flow (e.g., every contiguous block of 1-valued pixels becomes a polygon).

The first stage of wavefront engineering 600, in which MEEF constraints are added to the bitmap mask design problem, typically includes steps to form linearized constraints. For example, the derivation of constraint equation (bi-tone) has 4 steps. The first step may be to calculate the impact on wafer feature edge position of intensity error caused by mask bias error, given diffraction orders that are constrained to have prescribed ratios (approximation). Let "a" denote the list of D.O.'s (Diffraction Orders, whose ratios are known [in the absence of wavefront engineering (WE) error] in light of the optical domain intermediate solution that is established prior to initiation of wavefront engineering (WE)). Therefore, "a" lists the amplitudes of the diffraction order amplitudes of the optical domain intermediate solution as defined in the collection pupil of the lens. In general, the intensity I at an edge location on the image where we want to calculate MEEF will be given by a quadratic product involving a known matrix A:

$$I = a \cdot A \cdot a$$

Figure 5:
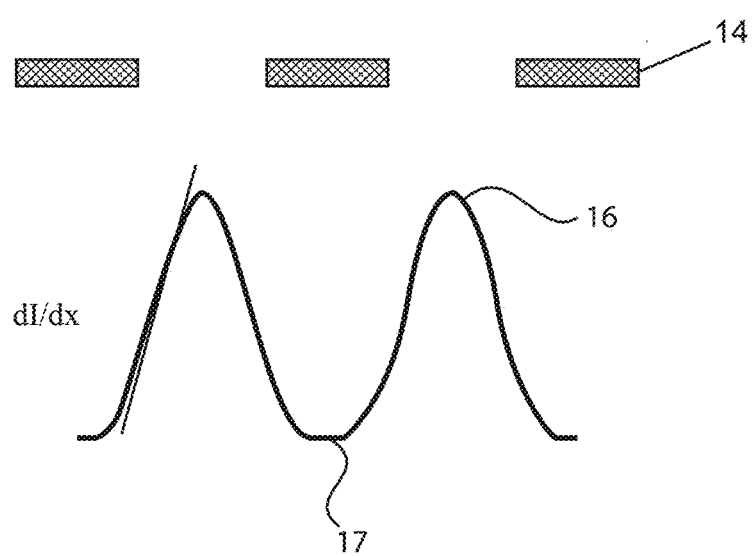
FIG. 5 is a plot showing a generic mask example along with a generic representation of the intensity of the light that transmits through the mask. The image slope dI/dx at the wafer position of interest is an important index of edge placement sensitivity, in accordance with one embodiment of the present disclosure.

However, the elements of a approximately stand in a prescribed ratio, and within this approximation the only unknown factor in I is the overall magnitude of the exposing wave, which is determined by the base amplitude a0, with a0 also being referred to as the reference order. Thus, the image slope dI/dx can be expressed, as depicted in FIG. 5, at the wafer position of interest as $dI/dx = K \cdot a0^2$, where K is a calculable constant. Let d denote the vector of perturbations in the diffraction order list a that are caused by a small increment of mask bias when this bias has a magnitude that just reaches the tolerance limit within which bias can be controlled when the mask is fabricated, this tolerance limit being referred to as a bias tolerance. In FIG. 5, Imax is identified by reference number 16 and Imin is identified by reference number 17. In FIG. 5 the mask is identified by reference number 14.

The intensity error ΔI resulting from this mask bias at the wafer position of interest is $$\Delta I = 2 \cdot (a \cdot A \cdot d).$$

Since a is only defined within an overall scale factor, i.e., a=a0 r, with r the D.O. ratios, and a0 the base amplitude, we can write ΔI in terms of a known vector P defined by P=r A. Specifically, we have:

$$\Delta I = a0 \cdot P \cdot d.$$

The second step of the wavefront engineering MEEF constraint generation typically includes calculating the error induced in the diffraction orders by mask bias error. The mask bias error in effect creates a differential rim of extra transmitted amplitude around every polygon. During wave engineering this is effectively present at every external edge of those pixels that lie along the periphery of any contiguous group of pixels having the same transmission, e.g. all 1. In the case of a bi-tone bitmap mask, each edge separating pixels of opposite kind contributes an incremental rim segment, while edges between pixels of the same kind contribute no increment. Any non-zero rim contribution is always positive, regardless of the sign of the transmission discontinuity (e.g. immaterial whether 0 pixel is on left and 1 on right, or vice-versa). The incremental edge contribution can be described with a list of binary variables e, whose elements are 1 when the associated edge is a true transmission discontinuity, and 0 otherwise (i.e. $e_i$ will be 0 when the pixels on each side of the ith edge have the same transmission).

In a following step, the Fourier transform of each of the rim-edges of all pixels is calculated as a matrix M. In some embodiments, each rim-edge can be treated as a very narrow rectangle (of known small width at the bias tolerance limit). This provides the following equation for the perturbations in the diffraction orders that are caused by a small increment of mask bias:

$$d = M \cdot e.$$

In the third step of MEEF constraint generation for the first stage of wavefront engineering, the overall MEEF constraint is formulated to add to the linear programming (LP). In particular, if L is the tolerance on allowable change in the printed wafer edge position due to mask error, a MEEF constraint may be added which specifies that the intensity error ΔI resulting from a mask that is biased at the bias tolerance limit must be kept no larger than the particular intensity error which would shift the printed wafer edge position by the maximum allowable change L:

$$L*(dI/dx) \geq \Delta I$$

which using the previous results means that:

$$L*K*a0\Delta 2 \geq a0*(P \cdot M) \cdot e$$

Since a0 can be assumed positive and is common to both terms, the above equation can be written as:

$$((L*K)*a0-(P \cdot M) \cdot e) \geq 0$$

In some embodiments, a0 (which may be the LP's objective, as well as the base amplitude) depends linearly on pixel transmission t via coefficients $F_0$, given that a0 is the base amplitude component of the overall wave which transmits through the pixels of transmission t. For example, if a0 is the DC wave component, the value of a0 would be the total amplitude that transmits through the pixels, and $F_0$ would simply be a list of 1's, i.e. $F_0$ would be a vector of the same length as t whose every element is 1. Use of $F_0$ to determine a0 provides the following equation controlling MEEF:

$$((L*K*F_0) \cdot t-(P \cdot M) \cdot e) \geq 0$$

In some embodiments, a constraint may be included that bounds the impact of mask bias error of the opposite sign, which is formed by changing the sign of the second term:

$$((L*K*F_0) \cdot t+(P \cdot M) \cdot e) \geq 0$$

For simplicity the term "MEEF constraint" may be considered to comprise this pair of constraint equations. These constraints have the preferred linear dependence on the problem variables (t and e), but to perform properly it is also generally necessary to include constraints (preferably linear) that force e to properly reflect the exterior/interior status of each pixel edge as the pixel transmissions t are changed.

In the fourth step of the first stage of the wave front engineering, additional binary variables may be defined to induce the proper status in e. However, in some embodiments, linear relaxation may be employed for this purpose, avoiding the use of binary variables. More specifically, in some embodiments of the former kind, when formulating the problem as a mixed integer linear programming (MILP) the option is available for approximately accounting for the eventual round-off of the pixel transmissions by adding new binary variables b to represent the rounded transmission. For example, in the case of Chromeless Phase shift Lithography (CPL) masks, the fabricable transmissions are −1 and +1, and the binary variable b for a particular pixel may be made to take on the value 0 when the transmission T of the associated pixel rounds to −1 (i.e. when −1<T<0), whereas b will be made to take on the value 1 when 1>T>0. Since the linear program solver is only allowed to set binary variables to 0 or 1, the rounding operation that b maps can be accomplished by adding constraints: b≥T and b≤1+T. These constraints will force b to properly indicate the polarity after rounding as long as T is confined to the range −1≤T≤+1 (as is appropriate in a formulation for CPL masks). At intermediate steps in the WE flow the pixel transmission T may have a value that is intermediate between the fabricable values of −1 and +1, but the associated b variable will indicate by its 0 or 1 value which fabricable polarity T is closest to during that step. As another example, in the case of opaque binary masks where the fabricable transmissions are 0 or 1, the 0 or 1 values of b may directly represent the rounded value of T, and if T is constrained to the range 0≤T≤1 with such masks, then b may be set to reflect this rounding by adding constraints b≥T−0.5 and b≥2T.

Figure 6A:
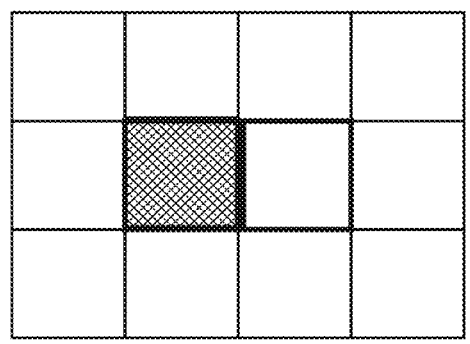
FIG. 6a is a bitmap mask depicting two adjacent pixels having an opposite transmission polarity, in which the adjacent pixels have an opposite polarity, in accordance with one embodiment of the present disclosure.
Figure 6B:
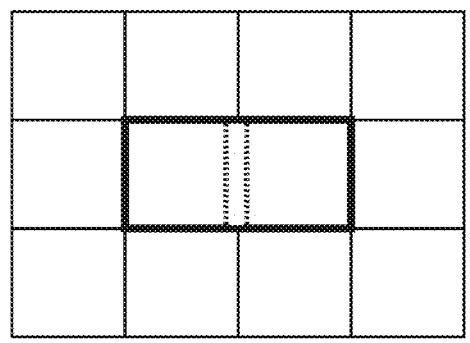
FIG. 6b is a bitmap mask depicting two adjacent pixels having an opposite transmission polarity, in which the adjacent pixels have a same polarity, in accordance with one embodiment of the present disclosure.

The wavefront engineering step can formulate polygon synthesis as a linear programming problem. The variables (mostly 0, 1-bounded in the case of non-phase-shifting masks) include pixel transmissions and edge variables e. FIG. 6a depicts one embodiment of a bitmask depicting two adjacent pixels having opposite transmission polarity, the edge between them therefore lying on the edge of a mask polygon, and mask bias error at this edge thus contributing to amplitude error (d). Edge variable e should switch on (i.e., to 1) when the pixels have opposite polarity as depicted in FIG. 6a. FIG. 6b depicts one embodiment of a bitmask depicting two adjacent pixels having same transmission polarity, the edge between them therefore not lying on the edge of a mask polygon, and mask bias error from this edge thus making a zero-valued contribution to amplitude error (d). Edge variable e should switch off (i.e., to 0) when the pixels have the same polarity. Suppose now that some edge with MEEF variable e is flanked by pixels whose rounded binary transmission variables are b1 and b2. For example, b1 may indicate the rounded transmission on the left ($t_{left}$) and b2 may be the rounded transmission on the right ($t_{right}$). Four linear constraints can be used to drive an edge variable e that is associated to the shared edge to 1 when the pixels have opposite polarity, and to 0 when they have the same polarity. In particular, the edge variables (e) can be given the proper discontinuity status by adding the linear constraints:

$$e<=b1+b2$$

$$e<=2-(b1+b2)$$

$$e>=b1-b2$$

$$e>=b2-b1$$

Proper discontinuity status is achieved because the value of e is required to lie between bounds of 0 and 1, and because b1 and b2 can only be 0 or 1. For example, in the case where b1=b2, either the first of these constraints (if b1=b2=0) or the second of these constraints (if b1=b2=1) will force e to 0. Also, when b1=b2, the third and fourth of these constraints will have no effect (i.e. they will always be automatically satisfied). On the other hand, when b1≠b2, b1+b2 will necessarily equal 1, and the first and second of these constraints will have no impact (i.e. they will be satisfied by any value of e in the allowed range), while either the third or fourth constraint will force e to 1. It should be noted that even though these constraints behave in this way because b1 and b2 are binary variables, the wavefront engineering (WE) process eventually forces all pixel transmissions to take on a fabricable value. This makes it possible to employ a linear relaxation in which binary variables like b1 and b2 are made continuous linear functions of the pixel transmission such that the two fabricable values are mapped to b=0 and b=1. In a linear relaxation the binary variables can be eliminated from the formulation by directly substituting this linear transformation into the constraint equations themselves. For example, in the case of an opaque binary mask where the two fabricable transmissions are 0 and 1, the linear map is a simple identity, and the four constraint equations that give each edge variable e its proper status can be written:

$$e<=t_{left}+t_{right}$$

$$e<=2-(t_{left}+t_{right})$$

$$e \geq = t_{left} - t_{right}$$

$$e \geq = t_{right} - t_{left}$$

The amplitude error d is then made proportional to the edge variables (e) via matrix M to obtain the MEEF constraint, as discussed. The MEEF constraint above can be generalized to include diffraction order error. Further details regarding binary mask synthesis as a linear programming (LP) problem are provided in U.S. Pat. No. 8,108,802 titled "Method for Forming Arbitrary Lithographic Wavefronts Using Standard Wavefronts Using Standard Mask Technology", which is incorporated herein by reference in its entirety. The method described in U.S. Pat. No. 8,108,802 pushes the t variables i.e., $t_{left}$ and $t_{right}$, to their 0, 1 bounds.

Figure 8:
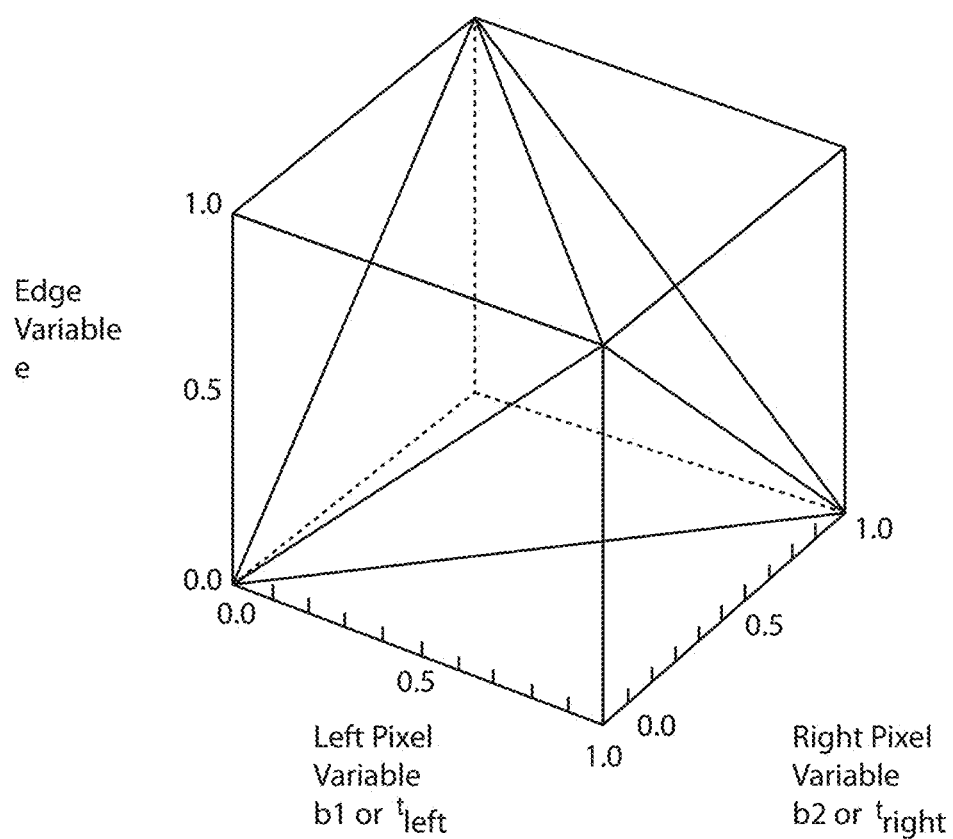
FIG. 8 is a graphical illustration of a projection of the feasible region onto a subspace of three variables of the SMO process, in accordance with one embodiment of the present disclosure.

Referring to FIG. 8, the four constraints confine e to the interior (including the bounding faces and edges) of the tetrahedron formed by the four linear constraints which define the edge variables' status, with each constraint defining one face of the tetrahedron. Mask binarization pushes the t variables to their (e.g. 0 or 1) bounds, or alternatively the four constraints may be defined in terms of the binary variables b0 and b1. Mask binarization therefore confines the solution to one of the four vertical edges of the Cartesian cube that bounds the tetrahedron. Binarization and the four edge variable constraints therefore act in combination to push the solution to align with one of the endpoints of either the upper or the lower edge of the tetrahedron, thereby giving e the proper value.

The above described linear constraints thus force the e variable for each edge to take on the value 0 when the transmissions of the two pixels on each side of the edge have the same value (whether both 0 or both 1), and also force the e variable to take on the value 1 when the pixels on each side have opposite polarity (regardless of which is which). Once this is done, the e variables will be 1 along the outside rims of the mask polygons, and will be 0 within interior or background areas. MEEF is concerned with mask bias error, and (positive) bias error causes excess light to be transmitted along the edges of the mask apertures (relative to the zero-bias baseline). Once the edge variables e are available to identify the mask locations where this bias-induced extra light is being added, the MEEF constraints can be reformulated as additional linear constraints which identify the worst-case MEEF error. In particular, an auxiliary variable can be added as a slack term in the MEEF constraints to designate the margin present between the term for the maximum allowable position change and the term for mask bias error (with this margin being positive if the constraint is satisfied). If the same auxiliary variable is used in the MEEF constraint for each feature edge location, the process of maximizing this variable will drive the variable to match the margin at the particular edge location whose constraint is first engaged, i.e. at the edge location which exhibits poorest MEEF at that stage of the optimization. The pixel transmissions are then further adjusted as the optimization proceeds in order to improve this worst-case MEEF error, which may involve different edge locations as the solution evolves. By maximizing the auxiliary margin variable as objective during the first stage of wavefront engineering, the worst-case MEEF error is thus minimized.

One example of linear programming having basic manufacturability constraints is now described in more detail. Basic mask manufacturability requirements can impact the success of wavefront engineering (WE) in achieving low MEEF solutions. In particular, if mask manufacturability requirements are not considered during wavefront engineering (WE), the masks that are created, though capable of closely reproducing the high quality optical domain intermediate solution, may contain transmitting regions that are too small or too closely spaced to be accurately manufactured. Such mask manufacturability problems can be partly mitigated during polygon domain optimization, but it can happen that the basic topology choices in a wavefront engineering (WE) solution that ignores manufacturability will be incapable of providing high quality solutions unless unmanufacturable mask features are left in place. In such cases subsequent adjustment of the transmitting shapes during polygon domain optimization is unlikely to be fully successful. One tactic for diminishing this source of MEEF vulnerability during wavefront engineering (WE) is to employ relatively coarse pixels in the bitmap, since all polygon widths and separations in the wavefront engineering (WE) output will be at least as large as a single pixel. This tactic also has the advantage of reducing the number of edges in the mask polygons, thereby reducing mask write-time. However, simply making all pixels large would result in poor matching to the optical domain intermediate solution. A good compromise can be obtained by starting the wavefront engineering (WE) process using large pixels, and then subdividing pixels in regions where the optical domain intermediate solution is poorly matched, as will be discussed. But even when such adaptively sized pixels are used, it is still possible for the wavefront engineering (WE) solution to suffer a poor manufacturability/quality tradeoff in regions where small pixels are found to be necessary, unless direct control of manufacturability is carried out during wavefront engineering (WE). Wavefront engineering (WE) solutions that severely violate manufacturability constraints will usually exhibit poor image contrast and therefore high MEEF once the mask is forced into conformance with the mask manufacturer's requirements. Thus, a preferred approach is to combine the adaptive pixel size method with direct constraints on mask manufacturability, with these constraints being preferably expressed in linearized form so that the wavefront engineering (WE) problem can be handled as a near linear programming problem. In one example, constraints are added to prevent the mask regions output by WE from having touching corners. Considering four adjacent pixels in a configuration like that shown in FIG. 7a, a touching corner condition in the output will have a form like that shown in FIG. 7b. If binary variables b1 to b4 represent the rounded transmissions of these four pixels in the manner described above, a touching corner condition at the shared corner will occur whenever the magnitude of the difference between the sum of the pixel b values across one of the two diagonals and the sum of the pixel values across the other diagonal takes on the largest possible value, namely 2. (When the difference is 0, the four pixels are either all identical, or are arranged as a pair of stripes, while a difference of magnitude 1 indicates three pixels with the same transmission and one that is opposite. A difference of magnitude 2 indicates a touching corner configuration.) Considering that the binary variables b are only allowed to have 0 or 1 as their value, touching corners can be prohibited at any shared pixel corner by adding the constraint $$|(b1+b4)-(b2+b3)| \leq 3/2$$

which in linear form is $$-3/2 \geq (b1+b4)-(b2+b3) \geq 3/2$$

Figure 7A:
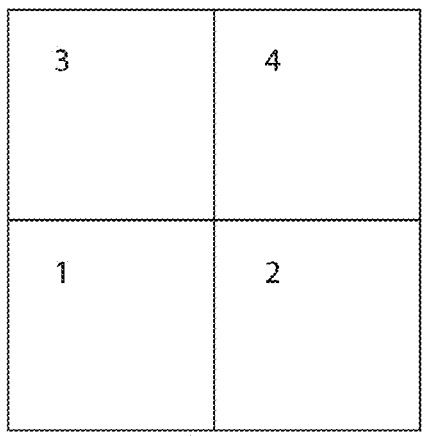
FIG. 7a depicts one embodiment of adjacent pixels of a bitmask numbered to denote the positioning of the pixels for a corner touching constraint, in accordance with one embodiment of the present disclosure.

Since the wave engineering (WE) process drives the pixel transmissions to fabricable values, it is possible to employ a linear relaxation in place of the b variables. For the case in which the mask-making process provides two fabricable transmissions, denoted $t_{max}$ and $t_{min}$, a linear relaxed constraint to prevent a touching corner condition at the corner shared by a 2×2 block of pixels with transmissions $t_1$, $t_2$, $t_3$, and $t_4$, is provided as follows:

$$-(1+\alpha)[t_{max}-t_{min}] \geq t_1+t_4-(t_2+t_3) \geq (1+\alpha)[t_{max}-t_{min}]$$

in which $\alpha \in [0,1]$ is a stiffness parameter which the linear relaxation makes possible, wherein $\alpha=0$ makes the constraint as strong as possible, while $\alpha=1$ essentially turns off the touching corner constraint. FIG. 7a depicts a bitmap having pixels number 1, 2, 3 and 4 corresponding to $t_1$, $t_2$, $t_3$ and $t_4$.

Figure 7B:
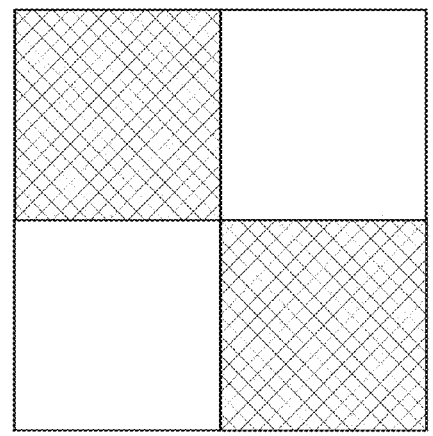
FIG. 7b depicts one embodiment of pixels of a bitmask for calculating a corner touching constraint, which illustrates a touching corner condition that should be prohibited by the constraint, in accordance with the present disclosure.

FIG. 7b depicts the pixel orientation for one type of potential touching corner condition where the constraint value is equal to $(1+1)[t_{max}-t_{min}]$, wherein in one example $t_1+t_4-(t_2+t_3)=-2$: violation when $\alpha=0$. Such an arrangement of bitmap pixels violates the touching corner constraints.

Figure 7C:
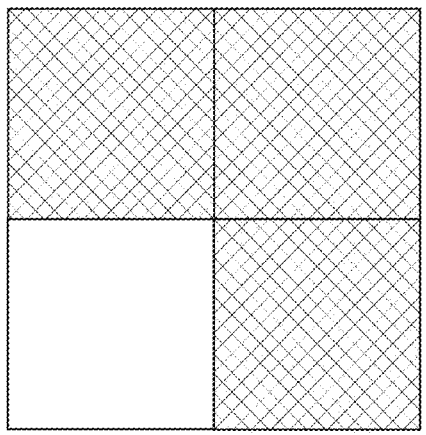
FIG. 7c depicts one embodiment of pixels of a bitmask for calculating a corner touching constraint illustrating a problem-free bitmask, in accordance with the present disclosure.

FIG. 7c depicts another pixel configuration that may be assessed for touching corner violation, in which the constraint value is equal to $(1+0)[t_{max}-t_{min}]$, wherein in one example $t_1+t_4-(t_2+t_3)=-1$. Such an arrangement of bitmap pixels does not violate the touching corner constraints.

Figure 7D:
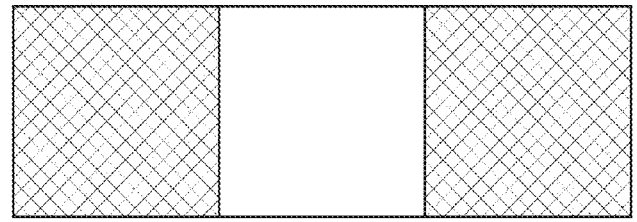
FIG. 7d depicts one embodiment of pixels of a bitmask for calculating a gap distance constraint, in accordance with the present disclosure.

During wavefront engineering (WE) it can also be advantageous to prevent the generation of mask regions that include severely unmanufacturable widths and spacings (e.g. very small widths and spaces), in order to ensure that the basic topology of the regions output from wavefront engineering (WE) is not inherently dependent on the use of unmanufacturable edge separations. Dimensions in the wavefront engineering (WE) output that are slightly finer than the mask manufacturer's tolerances can generally be brought back into conformance during polygon domain optimization. However, it is difficult for polygon domain optimization to change the basic topology of the polygons, so severely small separations should preferably be suppressed during wavefront engineering (WE). Small separations can potentially arise at any pixel whose width (in either dimension) is significantly smaller than the minimum manufacturable mask dimension. When such a pixel is present, it is therefore preferable to apply a constraint to the pixel that prevents its transmission from being of different polarity (after rounding) from that of the two neighboring pixels that face each other across the narrow dimension of the pixel to which the constraint is applied. In the absence of such a constraint, the optimizer may give the narrow central pixel an opposite polarity from that of each of its two neighbors, causing the central pixel to form a feature of excessively small and unmanufacturable width. Two such constraints should be applied if the pixel is narrow in both length and width. Each such constraint is referred to as a gap distance constraint. The threshold on pixel dimension that is used to determine whether such a gap distance constraint should be applied is denoted $l_{min}$. $l_{min}$ might, for example, be set at 60% of the minimum manufacturable mask dimension. FIG. 7d depicts a pixel configuration that in a preferred embodiment would be in violation of a gap distance constraint if the width of the central pixel were smaller than $l_{min}$. If the rounded b variables for the three pixels in FIG. 7d are, from left to right, $b_1$, $b_2$, and $b_3$, then applying a requirement that the absolute value of the difference between $b_2$ and the average of $b_1$ and $b_3$ must be smaller than ¾ will prevent a narrow dimension from being formed at the central pixel if the requirement is applied when the width $l_2$ of this pixel is smaller than $l_{min}$. This follows because the difference between $b_2$ and the average of $b_1$ and $b_3$ will be 0 when all three pixels have identical transmissions, and will be ±½ when two adjacent pixels have the same transmission while the remaining (exterior) pixel is of opposite polarity, whereas the difference will have magnitude 1 when the central pixel has opposite polarity from each of its neighbors. As with touching corner constraints, the convergence of the pixel transmissions to fabricable values during the WE flow allows a linear relaxation of the gap distance constraints in which the binary b variables are replaced by the continuous pixel transmission variables t (along with a remapping). In one embodiment, the gap distance constraint then becomes:

if $l_2 < l_{min}$ $$-(1+\alpha)[t_{max}-t_{min}] \leq 2t_2-(t_1+t_3) \leq (1+\alpha)[t_{max}-t_{min}]$$

wherein $\alpha \in [0,1]$ is a stiffness parameter for the gap distance constraint, where 0 means tightest and 1 means no gap distance constraints, and where $t_{min}$ and $t_{max}$ are the two fabricable mask transmissions (for example $t_{min}=0$ and $t_{max}=1$). In the FIG. 7d example, $t_{min}=0$ and $t_{max}=1$, and $2t_2-(t_1+t_3)=-2$, which implies a violation when $\alpha=0$, which a gap distance constraint will eliminate, or at least mitigate, by ensuring that the central pixel has the same polarity as at least one of its neighbors. However, it may occasionally happen that even the total width of two adjacent pixels will remain significantly smaller than the $l_{min}$ tolerance. It will be appreciated by those skilled in the art that more complicated constraint sets of a similar kind can be constructed in order to e.g. prevent two adjacent very small pixels from having the same transmission when the pixels that neighbor the pair each have the opposite polarity. Also, it will be clear that many alternative constraint forms can be constructed to suppress a particular unmanufacturable configuration. For example, an alternative form of the gap distance constraint which provides additional impetus towards binarization is:

If $l_2 < l_{min}$, $$t_2 \leq \beta([t_1+t_3]-t_{min})+(1-\beta)t_{max}$$

$$t_2 \geq \beta([t_1+t_3]-[t_{max}+t_{min}])+t_{min}$$

wherein $\beta$ is a stiffness parameter between 0 (no constraint) and 1 (strongest constraint).

It is not necessary that the corner rounding and gap distance constraints be always imposed at the same time as the MEEF constraints. In one embodiment, the wavefront engineering (WE) flow instead consists of different linear programming (LP) steps which vary the role of these different metric constraints, and the sequence of these linear programming (LP) steps may optionally be looped through more than once. In particular, it may be preferable during a first linear programming (LP) step in the sequence to maximize the base amplitude as objective, without constraining MEEF, gap distance, or touching corners, and to do so using a bitmap with relatively coarse pixels, such that the total number of pixels is, for example, about 3 times the number of collected diffraction orders, which may correspond to a pixel size of order 0.15 times the ratio of wavelength to lens numerical aperture. Once this first linear programming (LP) is solved, the pixel values of the solution can then be rounded to fabricable values in a way that removes touching corners, and the resulting worst-case errors in matching the optical domain intermediate solution assessed. As a next linear programming (LP) step, MEEF can be minimized as the objective in a second linear program, with constraints added to prevent the error in matching the optical domain solution from degrading below the level found in the rounded solution to the first linear programming (LP) step. Following the second linear programming (LP) solve, the solution can again be rounded while avoiding touching corners in the rounded result, and the resulting MEEF level used as a constraint on MEEF during a third linear programming (LP) solve with maximization of the base amplitude as the objective. New gridlines can then be inserted to subdivide pixels whose values in the third linear programming (LP) solution are relatively distant from the fabricable transmissions, or that exhibit a touching corner condition after rounding. Gap distance and touching corner constraints can then be added in all subsequent linear programming (LP), and a new sequence of the three linear programming (LP) solves repeated. Following this set of three new linear programming (LP) solves, new gridlines can then be inserted, and subsequent to that step a new step of temporarily rounding the pixel transmissions (without allowing touching corners) can be undertaken, removing any gridlines that become redundant after rounding (i.e. removing gridlines for which the two pixels on each side of the gridline always have the same rounded transmissions at every point along the gridline). Then, as a final step in the sequence, a step of nonlinear optimization can be carried out using the gridline positions as variables (with pixel transmissions fixed at the temporary rounded values), with this nonlinear optimization using a standard lithographic metric like integrated process window or worst-case PV band width as objective, preferably including constraints on gap distance, as well as constraints on contrast that are sufficient to prevent print-through (i.e. constraints that hold the intensity in dark image regions below the print threshold, and likewise constraints that keep the intensity in bright image regions above the print threshold). Once this sequence is complete, the sequence can be repeated in new iterations, for example, through a set of 3 to 5 loops. Although the linear program solves that are carried out in each step of the sequence are solved globally, and so need not commence with the solution from previous iterations, an embodiment in which the sequence is repeated through multiple loops can yield improved solution quality because the pixel layout will improve as new gridlines are inserted, and as the gridline positions are repeatedly re-optimized. The same quality benefit can be obtained with a single sequence of steps if the initial pixel layout is made very fine, but in that case the final output polygons will tend to contain an unnecessarily large number of edges, potentially increasing mask writetime (and cost), and increasing the complexity of the gap distance constraints. The complexity-sensitive embodiment in which the sequence is repeatedly looped through (for example, between three and five times) can provide a more frugal deployment of fine pixels to those image regions where fine edge fragmentation is required, assuming that the initial bitmap is relatively coarse, for example containing pixels of roughly 0.15 times the ratio of wavelength to lens numerical aperture. In an alternative embodiment, a fine bitmap is used throughout the WE flow, and small edges are trimmed away between successive later iterations of polygon domain optimization.

Figure 3D:
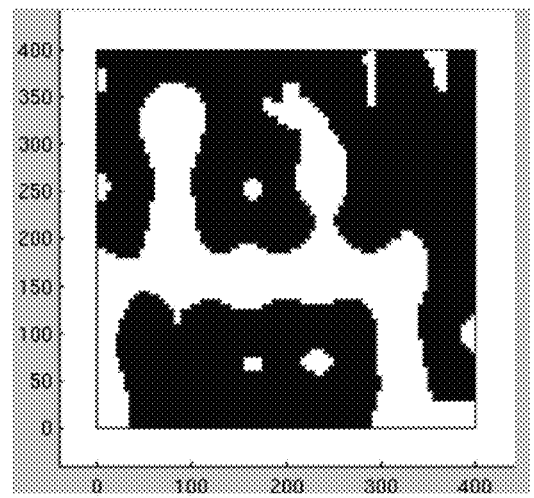
FIG. 3d depicts a mask after the first stage of wavefront engineering of a source mask optimization step without using the bright efficiency constraint.
Figure 3E:
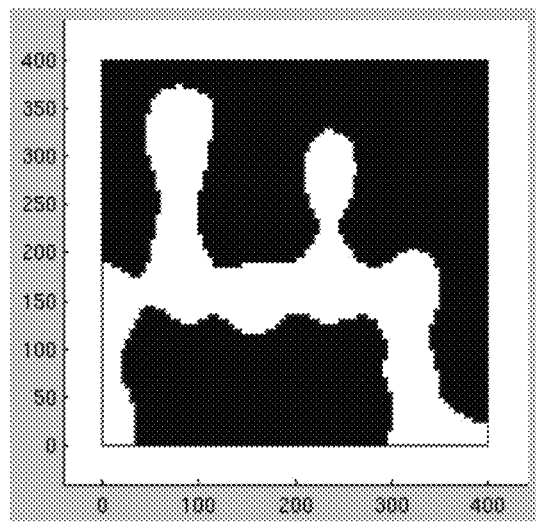
FIG. 3e depicts a mask after the first stage of wavefront engineering of a source mask optimization step using the bright efficiency constraint, in accordance with the present disclosure.

FIG. 3d depicts a mask after the first stage of wavefront engineering of a source mask optimization step without using the bright efficiency constraint. The integrated dose/focus common process window (CW) of the structure depicted in FIG. 3d was 0.086, the efficiency was 35.7 and the MEEF value was approximately 12.3. With such a large MEEF the practical lithographic performance will typically be gated by mask error. This result depicted in FIG. 3d shows illustrates the low efficiency value brings many assist features (SRAFs). The assist features (SRAFs) increase the MEEF value of the structure depicted in FIG. 3d. The FIG. 3e depicts a mask after the first stage of wavefront engineering of a source mask optimization step, and using the bright efficiency constraint, in accordance with the present invention. The CW of the structure depicted in FIG. 3e was 0.059, which adequately approximates the 6%-micron process window anticipated for such technologies, while the efficiency was increased to 51.3, and the MEEF value reduced to approximately 9.5. This result shows that final MEEF decreases by using the bright efficiency constraint. There are no assist features (SRAFs) depicted in FIG. 3e.

Referring to FIG. 1, in some embodiments, the methods disclosed herein may directly control/improve MEEF during polygon-domain stages at step 700 in the second stage of wavefront engineering or spatial domain joint optimization. This final joint optimization 700 of the mask clips with the source often is the final step of the flow, i.e. it provides the output results, which comprise both critical clips that have improved MEEF, and a source that will typically reduce MEEF in new clips that were not considered during SMO. In some embodiments, this step of jointly optimizing all clips together with the source can be computationally quite expensive. We use the second stage of wavefront engineering (WES2) to speed up the process.

For example, polygon-domain joint optimization will progress faster if the input clips already provide reasonably good performance. Conversely, polygon-domain joint optimization can be particularly slow when the initial clip solutions are infeasible; that is to say when they contain full-fledged violations of the rules for maximum allowed MEEF, or when they have outright manufacturability violations. The second stage of wavefront engineering (WES2) provides an efficient and parallelizable way to remove all or nearly all infeasibilities.

The second stage of wavefront engineering (WES2) optimizes the clips under much the same formulation as does polygon-domain joint optimization, but it leaves the source variables fixed. This makes the second stage of wavefront engineering faster, and it also allows the separate clips to be processed by different CPUs, since the source parameters no longer constitute coupling variables. Thus, processing the clips with second stage of the wavefront engineering before commencing polygon-domain joint optimization is a very efficient way to provide the latter step with starting designs that are all (or almost all) feasible, and generally already of high quality, which in turn makes the polygon-domain joint optimization step run more quickly. One also has the option of further improving efficiency by carrying out polygon-domain joint optimization only on the most difficult and problematic clips that are output by second stage of wavefront engineering, and then at the end repeating the second stage of wavefront engineering on the omitted clips using the revised source that is output by polygon-domain joint optimization.

In some embodiments, a "zig-zag" strategy can be used within both the polygon-domain joint optimization 700 and the second stage wavefront engineering steps 600, where one first optimizes (i.e. improves) MEEF while maintaining the quality of other lithographic metrics, and then carries out a subsequent stage of optimization where MEEF is constrained at or near the level previously attained while another metric like mask manufacturability is improved.

In the stage where the MEEF is optimized, i.e., MEEF is the objective, the problem formulation may include variables $X=[x_1, x_2, \ldots, x_m, y_1, y_2, \ldots, y_n, Z_{max}]$, where the x and y variables are, respectively, the positions of the vertical and horizontal edges in the layout, and where $Z_{max}$ is a "virtual" (i.e. auxiliary) variable for maximizing MEEF (e.g. where the optimizer forces $Z_{max}$ to match the slack in the most tightly binding of the MEEF constraints, all of which use $Z_{max}$ as a slack variable).

In the stage where the MEEF is optimized, i.e., MEEF is the objective, the problem formulation may include objectives and constraints, such as the diffraction order error (DOE), which may be measured as the worst-case error in matching the wave amplitudes of the intermediate optical domain solution, the MEEF, the dark region intensity (DARK) and the manufacturability constraints (shape penalty [PSHAPE], gap penalty [PGAP] and crossing penalty [PCROSSING]) such as:

min $Z_{max}$ (Minimize virtual maximum MEEF variable)

s.t. $-DOE_{threshold} < DOE_k(x,y) < DOE_{threshold}$ ($\forall k \in N, 1 \leq k \leq N_{DOE}$)

$-Z_{max} < MEEF_k(x,y) < Z_{max}$ ($\forall k \in N, 1 \leq k \leq N_{MEEF}$)

$DARK_k(x,y) < DARK_{control}$ ($\forall k \in N, 1 \leq k \leq N_{DARK}$)

$Pshape_k(x,y) < P_{control}$ ($\forall k \in N, 1 \leq k \leq N_{shape}$)

$Pgap_k(x,y) < P_{control}$ ($\forall k \in N, 1 \leq k \leq N_{gap}$)

$Pcrossing_k(x,y) < w_{crossing}$ ($\forall k \in N, 1 \leq k \leq N_{crossing}$)

In the stage where the MEEF is constrained at or near the level previously attained, and the mask manufacturability is improved, i.e., manufacturability is the objective, the problem formulation may include an auxiliary variable $Z'_{max}$ that represents the slack in all mask manufacturability constraints. The process of minimizing $Z'_{max}$ forces $Z'_{max}$ to become equal to the worst case manufacturing infeasibility, so that optimization of the mask edge variables can then cause manufacturability to improve. If manufacturability improves to the point that all mask features are manufacturable (i.e. a negative $Z'_{max}$ is achieved), then subsequent optimization steps need only require that each unslacked manufacturability constraint be met.

In particular, in the stage where the MEEF is constrained at or near the level previously attained, and the mask manufacturability is improved, i.e., manufacturability is the objective, the problem formulation may include the manufacturability constraints for shape penalty [PSHAPE], gap penalty [PGAP] and crossing penalty [PCROSSING] i.e.:

min $Z_{max}$ (Minimize virtual maximum penalty variable)

s.t. $-DOE_{threshold} < DOE_k(x,y) < DOE_{threshold}$ ($\forall k \in N, 1 \leq k \leq N_{DOE}$)

$-MEEF_{control} < MEEF_k(x,y) < MEEF_{control}$ ($\forall k \in N, 1 \leq k \leq N_{MEEF}$)

$DARK_k(x,y) < DARK_{control}$ ($\forall k \in N, 1 \leq k \leq N_{DARK}$)

$Pshape_k(x,y) < Z_{max} < 0$ ($\forall k \in N, 1 \leq k \leq N_{shape}$)

$Pgap_k(x,y) < Z_{max} < 0$ ($\forall k \in N, 1 \leq k \leq N_{gap}$)

$Pcrossing_k(x,y) < w_{crossing}$ ($\forall k \in N, 1 \leq k \leq N_{crossing}$)

Detailed descriptions of these manufacturability functions, i.e., shape penalty, gap penalty, and crossing penalty, may be found in U.S. Pat. No. 8,028,254 and U.S. Pat. No. 8,539,390, which are both titled "Determining manufacturability of lithographic mask using continuous derivatives characterizing the manufacturability on a continuous scale".

Referring to the spatial joint optimization step 700, to compensate for the compromise in image quality that may be introduced at the wavefront engineering step 600, one may readjust the mask polygons and the source variables in a step of joint local optimization, which is herein referred to as spatial domain joint optimization. In the case of multiple exposures separate variables can be used to define the polygons and sources for each mask. One may optionally apply this step only to the most critical features (or clips) when the source variables are also being optimized, and may further apply it to a larger set of clips without re-adjusting the source variables (a procedure which may continue to be referred to as spatial domain joint optimization for simplicity, but which may also be referred to as a WES2 operation). This improves efficiency since joint optimization of mask and source variables is numerically intensive and difficult to parallelize. One may also optionally apply a step of further optimizing the source against a larger set of clips without re-adjusting the mask variables.

Once the optimal source shapes and masks are determined employing the steps 100-700, a design for a set of masks is generated at step 1000. The set of masks are designed to generate the optimal wavefront during exposure when illuminated by the illumination sources. The optimal source shapes and masks can be deployed in the lithographic exposure tool, and semiconductor wafers are exposed to print the circuit designs. Methods to convert the exposed image into circuit patterns using a photoresist layer and pattern-transfer processes are well-known in the art. When multiple exposures are employed each mask is sequentially projected onto the wafer using its associated source.

In another aspect, the present disclosure describes a method of patterning a semiconductor device. The method may begin with providing a mask that has been produced using a source mask optimization process that includes controlling MEEF during at least one step of the source mask optimization; and patterning a photoresist layer using the mask. The source mask optimization process suitable for the above described method has been described with reference to FIGS. 1-8. For example, controlling MEEF during the source mask optimization process flow may include controlling the MEEF during a spatial domain optimization. In another example, controlling MEEF during the source optimization includes controlling the MEEF during at least one frequency domain optimization. The photoresist layer that is patterned using the mask comprise dielectrics including carbon, oxygen, and various inorganic materials. Patterning may comprises at least one of a laser and optics.

The method is suitable to any semiconductor device. As used herein, the term "semiconductor device" refers to an intrinsic semiconductor material that has been doped, that is, into which a doping agent has been introduced, giving it different electrical properties than the intrinsic semiconductor. For example, the semiconductor device that is formed by the patterning method may be a field effect transistor (FET), junction field effect transistor (JFET), a bipolar junction transistor (BJT), Schotkky barrier type device, thin film transistor, as well as a memory device, such as a random access memory (RAM) device, static random access memory device, flash memory device, dynamic random access memory (DRAM) device. The method can be used to form capacitors, resistors, diodes and fuse structures. The method is also suitable for use in solar cell applications.

Having described preferred embodiments of a system and method (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

What is claimed is:

1. A source mask optimization (SMO) method comprising:
controlling, via a processor, bright region efficiency during at least one optical domain step to provide an optical domain intermediate solution, the bright region efficiency being a proportion of a total transmitted light that is transferred to bright areas of a target pattern;
binarizing the optical domain intermediate solution provided by the at least one optical domain step to obtain an initial spatial domain solution with a controlled MEEF (Mask Error Enhancement Factor); and
controlling MEEF during at least one spatial domain step that optimizes the initial spatial domain solution of a mask.

2. The method of claim 1, wherein controlling bright region efficiency comprises setting bright region efficiency constraint using a joint eigenvector based mask optimization step, the joint eigenvectors being eigenvectors of matrix that relate intensity of light source and intensity on wafer and enable the derivation of a high contrast mask solution.

3. The method of claim 2, further comprising maintaining the bright region efficiency constraint through an entirety of a frequency domain optimization flow, wherein the frequency domain optimization flow includes a source initiation step, a mask optimization step, a source optimization step and a joint optimization step.

4. The method of claim 1, wherein the bright region efficiency comprises efficiency expressed by the equation:

Efficiency=(Power of Bright Area/Area of Bright)/
(Power of Total Diffracted In Band Limit/Area of Total).

5. The method of claim 1, wherein controlling MEEF comprises introducing MEEF constraint/objective in wavefront engineering.

6. The method of claim 1, wherein binarizing the optical domain intermediate solution includes forming a bitmap mask.

7. The method of claim 5, wherein introducing MEEF constraint/objective comprises linearizing MEEF constraint by introducing variables into the wavefront engineering indicating the presence or absence of a transmission discontinuity.

8. The method of claim 5, wherein introducing MEEF constraint/objective comprises directly controlling MEEF during wavefront engineering to minimize a worst case MEEF.

9. A non-transitory computer readable storage medium comprising a computer readable program for performing a source mask optimization (SMO) method, wherein the non-transitory computer readable program when executed on a computer causes the computer to perform the steps of:
controlling bright region efficiency during at least one optical domain step to provide an optical domain intermediate solution, the bright region efficiency being a proportion of a total transmitted light that is transferred to bright areas of a target pattern;
binarizing the optical domain intermediate solution provided by the at least one optical domain step to obtain an initial spatial domain solution with a controlled MEEF (Mask Error Enhancement Factor); and
controlling MEEF during at least one spatial domain step that optimizes the initial spatial domain solution of a mask.

10. The program product according to claim 9, wherein controlling bright region efficiency comprises setting bright region efficiency constraint using a joint eigenvector based mask optimization step, the joint eigenvectors being eigenvectors of matrix that relate intensity of light source and intensity on wafer and enable the derivation of a high contrast mask solution.

11. The program product according to claim 10, further comprising integrating the bright region efficiency constraint through an entirety of a frequency domain.

12. The program product according to claim 11, wherein the frequency domain includes a source initiation step, a mask optimization step, a source optimization step and a joint optimization step.

13. The program product according to claim 12, wherein the bright region efficiency comprises efficiency expressed by the equation:

Efficiency=(Power of Bright Area/Area of Bright)/
(Power of Total Diffracted In Band Limit/Area of Total).

14. The program product according to claim 9, wherein controlling MEEF comprises introducing MEEF constraint/objective in wavefront engineering.

15. The program product according to claim 9, wherein binarizing the optical domain intermediate solution includes forming a bitmap mask.

16. The program product according to claim 14, wherein introducing MEEF constraint/objective comprises linearizing MEEF constrain t by introducing variables the wavefront engineering indicating the presence or absence of a transmission discontinuity.

17. The program product of claim 16, wherein introducing MEEF constraint/objective comprises directly controlling MEEF during wavefront engineering.

* * * * *